US008473206B2

(12) United States Patent
Kim et al.

(10) Patent No.: US 8,473,206 B2
(45) Date of Patent: *Jun. 25, 2013

(54) APPARATUS AND METHOD FOR EXECUTING TELECOMMAND ON GEOSTATIONARY SATELLITE, AND APPARATUS AND METHOD FOR VERIFYING TELECOMMAND EXECUTION STATUS ON GEOSTATIONARY SATELLITE GROUND CONTROL SYSTEM

(75) Inventors: In Jun Kim, Daejeon (KR); Won Chan Jung, Daejeon (KR); Jae Hoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1423 days.

This patent is subject to a terminal disclaimer.

(21) Appl. No.: 12/114,047

(22) Filed: May 2, 2008

(65) Prior Publication Data

US 2009/0015466 A1    Jan. 15, 2009

(30) Foreign Application Priority Data

Jul. 13, 2007    (KR) .................. 10-2007-0070799

(51) Int. Cl.
*G01C 21/00*    (2006.01)

(52) U.S. Cl.
USPC .............. 701/468; 701/1; 701/13; 701/438; 701/531

(58) Field of Classification Search
None
See application file for complete search history.

(56) References Cited

U.S. PATENT DOCUMENTS

| | | | |
|---|---|---|---|
| 4,654,860 A * | 3/1987 | Ouimet et al. ............... 375/214 |
| 5,262,953 A * | 11/1993 | de Waard et al. ............ 701/531 |
| 5,502,726 A * | 3/1996 | Fischer ......................... 370/392 |
| 5,721,810 A * | 2/1998 | Hahn et al. ..................... 706/47 |
| 5,790,567 A * | 8/1998 | Bolotin et al. ................. 714/752 |
| 5,790,568 A * | 8/1998 | Luong et al. ................... 714/781 |
| 5,951,609 A * | 9/1999 | Hanson et al. .................. 701/13 |
| 6,130,898 A * | 10/2000 | Kostreski et al. ............. 370/522 |

(Continued)

FOREIGN PATENT DOCUMENTS

| | | |
|---|---|---|
| KR | 100204051 B1 | 3/1999 |
| KR | 10-0653185 | 11/2006 |

OTHER PUBLICATIONS

Supplemental Double Patenting Guidance.*
Supplemental CCSDS Report Concering Space Data System Standard.*

*Primary Examiner* — Ian Jen
(74) *Attorney, Agent, or Firm* — Rabin & Berdo, P.C.

(57) ABSTRACT

Provided are an apparatus and method for executing a telecommand on a geostationary satellite, and an apparatus and method for verifying a telecommand execution status on a geostationary satellite ground control system. When a telecommand on a satellite is executed, the satellite generates command execution verification words for the executed telecommand and adds the generated command execution verification words to a telemetry transfer frame, and thus a satellite ground control system can easily verify the telecommand execution. In addition, when telecommand execution result is verified by a satellite ground control system, since an execution result of a time-tag telecommand can be verified without a time delay through command execution verification words provided by a satellite, and a telecommand image DB, a telecommand verifier DB, and a telecommand verifier provided by the satellite ground control system, a series of processes from transmission to verification of a telecommand, in particular a time-tag telecommand, can be automatically processed in real-time without intervention of an operator.

18 Claims, 4 Drawing Sheets

U.S. PATENT DOCUMENTS

| | | | |
|---|---|---|---|
| 6,542,820 B2 * | 4/2003 | LaMance et al. | 701/478 |
| 6,587,443 B1 * | 7/2003 | Dutta | 370/322 |
| 6,597,892 B1 * | 7/2003 | Caldwell et al. | 455/12.1 |
| 6,608,589 B1 * | 8/2003 | Devereux et al. | 342/357.29 |
| 6,807,398 B1 * | 10/2004 | Satoh | 455/13.2 |
| 7,542,829 B2 * | 6/2009 | Lee et al. | 701/13 |
| 2003/0098810 A1 * | 5/2003 | Lee et al. | 342/357.06 |
| 2003/0132878 A1 * | 7/2003 | Devereux et al. | 342/357.06 |
| 2004/0259497 A1 * | 12/2004 | Dent | 455/13.3 |
| 2006/0136103 A1 * | 6/2006 | Lee et al. | 701/13 |
| 2007/0101201 A1 * | 5/2007 | Kim et al. | 714/45 |
| 2007/0111724 A1 * | 5/2007 | Kim et al. | 455/427 |

* cited by examiner

APPARATUS AND METHOD FOR EXECUTING TELECOMMAND ON GEOSTATIONARY SATELLITE, AND APPARATUS AND METHOD FOR VERIFYING TELECOMMAND EXECUTION STATUS ON GEOSTATIONARY SATELLITE GROUND CONTROL SYSTEM

CROSS-REFERENCE TO RELATED PATENT APPLICATION

This application claims the benefit of Korean Patent Application No. 10-2007-0070799, filed on Jul. 13, 2007, in the Korean Intellectual Property Office, the disclosure of which is incorporated herein in its entirety by reference.

BACKGROUND OF THE INVENTION

1. Field of the Invention

The present invention relates to an apparatus and method for executing a telecommand on a satellite, and more particularly, to an apparatus and method for executing a telecommand on a geostationary satellite by generating command execution verification words in order for a satellite ground control system to be able to verify the execution of the telecommand, and an apparatus and method for verifying telecommand execution in order to real-time verify whether a telecommand transmitted from a satellite ground control system controlling a geostationary satellite to the geostationary satellite based on command execution verification words has been normally executed by a satellite on-board.

The present invention is derived from a research project supported by the Communications, Ocean and Meteorological Satellite program of the Ministry of Information and Communication (MIC) and the Institute for Information Technology Advancement (IITA) [2007-S-301, Development of Satellite Communication System for Communications, Ocean and Meteorological Satellite].

2. Description of the Related Art

In general, in order to operate a satellite, a satellite ground control system for monitoring and controlling a state of the satellite on the ground is necessary, and professional manpower for operating the satellite ground control system is required. The professional manpower operates the satellite by transmitting many commands to the satellite using the satellite ground control system while the satellite is launched and operated. Thus, telecommand transmission and verification using the satellite ground control system is the most frequent and important work in the operation of the satellite ground control system. Since the telecommand transmission and verification is the frequent work, the possibility of operator's mistakes is high, and the operator's mistakes may fatally affect the satellite.

Thus, recent satellite ground control systems are trying to prevent the operator's mistakes in advance by automating and systematizing such a work.

For example, as a trial for automating telecommand verification using a satellite operation knowledge base, by generating a knowledge base regarding states of telemetry data responding to telecommands, a problem occurrence state violating this rule is automatically sensed.

However, this method has been applied to real-time processed telecommands, and it is difficult to systematically determine whether a time-tag telecommand has been normally executed. That is, whereas a real-time telecommand can be verified whether it has been normally executed by checking telemetry values to be confirmed right after the real-time telecommand is executed, a time-tag telecommand is executed at a predetermined specific time not real-time, and thus since the time-tag telecommand may be executed after several hours, dates, or weeks, a satellite ground control system cannot wait until the time-tag telecommand is executed.

Thus, an apparatus and method for verifying that each telecommand has been executed right after even a time-tag telecommand was executed are required.

SUMMARY OF THE INVENTION

The present invention provides an apparatus and method for verifying telecommand execution on a satellite ground control system in order to perform automatic verification, minimize an operator's role, and improve real-time processing performance when verifying whether a telecommand transmitted from the satellite ground control system to a satellite, in particular a telecommand such as a time-tag telecommand executed at a predetermined specific time, has been exactly executed.

The present invention also provides an apparatus and method for executing a telecommand, in particular a time-tag telecommand, on a satellite in order for a satellite ground control system to real-time verify the execution of the telecommand by the satellite executing the telecommand, generating information regarding the telecommand execution, and transmitting the generated information to the satellite ground control system.

The objectives, characteristics, and merits of the present invention will be understood through the description below and will be more clarified by preferred embodiments of the invention. In addition, it will be easily understood that the objectives, characteristics, and merits of the present invention can be realized by methods in the claims and their combinations.

According to an aspect of the present invention, there is provided an apparatus for executing a telecommand on a satellite, the apparatus comprising: a telecommand receiver receiving a telecommand signal from a satellite ground control system and extracting a telecommand transfer frame from the received telecommand signal; a link control unit determining validity of the extracted telecommand transfer frame; an on-board computer executing a telecommand of a valid telecommand transfer frame, generating command execution verification words containing telecommand execution information, and generating a telemetry transfer frame containing the command execution verification words and telemetry data; and a telemetry transmitter transmitting the telemetry transfer frame to the satellite ground control system.

According to another aspect of the present invention, there is provided an apparatus for verifying telecommand execution on a satellite ground control system, the apparatus comprising: a telecommand transmitter transmitting a telecommand signal to a satellite; a telecommand image database (DB) storing detail information on the transmitted telecommand as an image; a telecommand verifier DB matching and storing telemetry data with the telecommand; a telecommand receiver receiving a telemetry transfer frame generated by executing the telecommand from the satellite and extracting command execution verification words from the received telemetry transfer frame; a telecommand execution verifier extracting telecommand execution information from the command execution verification words, inquiring related telecommand detail information from the telecommand image DB based on the telecommand execution information, inquiring telemetry data matching with the telecommand from the telecommand verifier DB based on the telecommand execution information, and extracting a measurement value of the inquired telemetry data from the telemetry transfer frame; and a knowledge-base system determining based on the telecommand detail information and the measurement value of the telemetry data whether the measurement value of the telemetry data is normal so that the telecommand execution verifier determines whether the telecommand has been normally performed.

According to an another aspect of the present invention, there is provided a method of executing a telecommand on a satellite, the method comprising: receiving a telecommand signal from a satellite ground control system and extracting a telecommand transfer frame from the received telecommand signal; determining validity of the extracted telecommand transfer frame; executing a telecommand of a valid telecommand transfer frame; generating command execution verification words containing execution information of the executed telecommand and generating a telemetry transfer frame containing the command execution verification words and telemetry data; and transmitting the telemetry transfer frame to the satellite ground control system.

According to another aspect of the present invention, there is provided a method of verifying telecommand execution on a satellite ground control system, the method comprising: transmitting a telecommand signal to a satellite and storing detail information on the transmitted telecommand as an image; receiving a telemetry transfer frame generated by executing the telecommand from the satellite and extracting command execution verification words from the received telemetry transfer frame; extracting telecommand execution information from the command execution verification words; inquiring related telecommand detail information based on the telecommand execution information; inquiring telemetry data matching with the telecommand based on the telecommand execution information; extracting a measurement value of the inquired telemetry data from the telemetry transfer frame; determining based on the telecommand detail information and the measurement value of the telemetry data whether the measurement value of the telemetry data is normal; and determining based on a result of the determination whether the telecommand has been normally performed.

According to another aspect of the present invention, there is provided a computer readable recording medium storing a computer readable program for executing the methods.

Accordingly, according to the present invention, when a telecommand on a satellite is executed, the satellite generates command execution verification words for the executed telecommand and adding the generated command execution verification words to a telemetry transfer frame, and thus a satellite ground control system can easily verify the telecommand execution.

In addition, when telecommand execution result is verified by a satellite ground control system, since an execution result of a time-tag telecommand can be verified without a time delay through command execution verification words provided by a satellite, and a telecommand image DB, a telecommand verifier DB, and a telecommand verifier provided by the satellite ground control system, a series of processes from transmission to verification of a telecommand, in particular a time-tag telecommand, can be automatically processed in real-time without intervention of an operator.

Thus, a conventional problem that it is difficult for an operator to check at a predetermined time, due to a time difference from several hours to several weeks for execution of a time-tag telecommand, whether the time-tag telecommand has been normally executed can be solved. Thus, an operator's effort for satellite operation can be minimized, mistakes due to the operator can be minimized, and a reliable telecommand execution verification result can be provided.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will be described in detail by explaining embodiments of the invention with reference to the attached drawings. Like reference numerals in the drawings denote like elements. In the following description, well-known functions or constructions are not described in detail since they would obscure the invention with unnecessary detail.

In addition, when a part "includes" or "comprises" a component, this means that the part can further include other components not excluding other components unless there is specific description.

Figure 1:
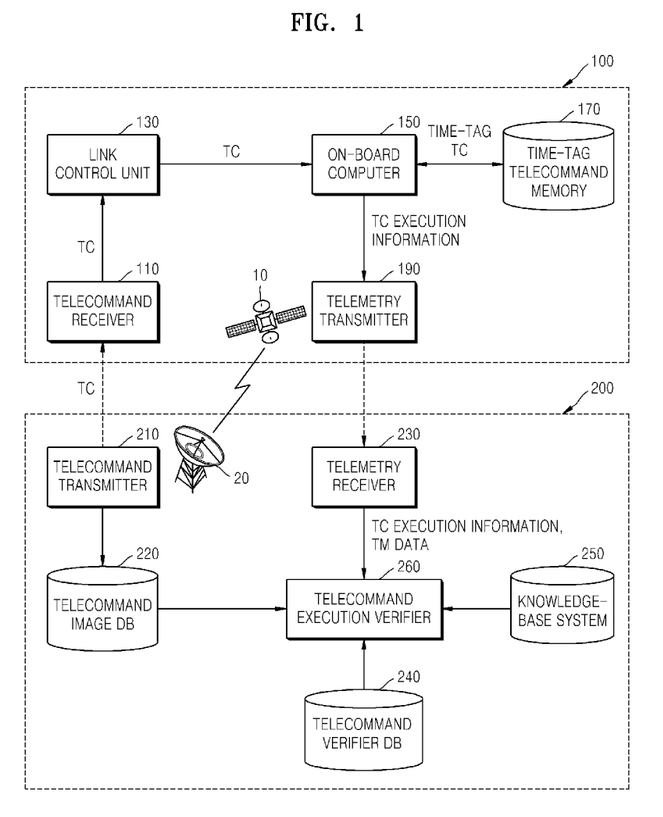
FIG. 1 is a schematic block diagram of a satellite system according to an embodiment of the present invention.

FIG. 1 is a schematic block diagram of a satellite system according to an embodiment of the present invention.

Referring to FIG. 1, the satellite system according to the current embodiment includes a satellite 10 including a telecommand execution apparatus 100 and a satellite ground control system 20 including a telecommand execution verification apparatus 200.

The telecommand execution apparatus 100 of the satellite 10 extracts a telecommand transfer frame from a telecommand signal received from the satellite ground control system 20, determines validity of the extracted telecommand transfer frame, and executes a telecommand using an on-board computer 150 included in the telecommand execution apparatus 100 at real-time or a predetermined specific time. After executing the telecommand, the telecommand execution apparatus 100 confirms that the on-board computer 150 has executed the telecommand, generates command execution verification words containing telecommand execution information, carries the generated command execution verification words on a telemetry transfer frame, and transmits the telemetry transfer frame to the satellite ground control system 20. By doing this, the satellite ground control system 20 can determine immediately after the telecommand is executed whether a real-time telecommand or a time-tag telecommand has been executed.

The telecommand execution apparatus 100 of the satellite 10 includes a telecommand receiver 110, a link control unit 130, the on-board computer 150, a time-tag telecommand memory 170, and a telemetry transmitter 190.

The telecommand receiver 110 receives a telecommand signal from the satellite ground control system 20 and extracts a telecommand transfer frame from the received telecommand signal.

The link control unit 130 determines validity on whether the extracted telecommand transfer frame has been normally received. That is, the link control unit 130 rejects an abnormally received telecommand transfer frame and transmits a normally received telecommand transfer frame to the on-board computer 150.

The on-board computer 150 extracts a telecommand packet from the telecommand transfer frame and determines whether the extracted telecommand packet corresponds a real-time telecommand or a time-tag telecommand that must be executed at a predetermined specific time. The on-board computer 150 executes the telecommand in real-time or at the predetermined specific time.

The on-board computer 150 determines a telecommand type, immediately executes the telecommand in a case of the real-time telecommand, and stores the time-tag telecommand in the time-tag telecommand memory 170 until the predetermined specific time in a case of the time-tag telecommand. The on-board computer 150 reads the time-tag telecommand from the time-tag telecommand memory 170 and executes the read time-tag telecommand when an on-board time of the satellite 10 meets a time designated by a time tag of the time-tag telecommand.

The on-board computer 150 generates command execution verification words according to a telecommand execution result. The command execution verification words contain telecommand execution information, such as an executed on-board time, a type of the telecommand, and a unique number of the telecommand, for uniquely identifying the executed telecommand. The type of the telecommand and the unique number of the telecommand are represented with hexadecimal code.

The time-tag telecommand memory 170 receives the time-tag telecommand from the on-board computer 150 and stores the received time-tag telecommand until the time-tag telecommand is executed by the on-board computer 150. An execution time of the time-tag telecommand and hexadecimal code of the time-tag telecommand are stored.

The telemetry transmitter 190 generates a telemetry transfer frame containing the command execution verification words and general telemetry data and transmits the telemetry transfer frame to the satellite ground control system 20. The telemetry transfer frame includes a command execution verification word flag byte in a header. The telemetry transfer frame will be described in more detail later.

The telecommand execution verification apparatus 200 of the satellite ground control system 20 stores detail image information of a telecommand when transmitting the telecommand. The telecommand execution verification apparatus 200 of the satellite ground control system 20 also acquires detail information of the telecommand and telemetry data information needed for verification using least telecommand information contained in command execution verification words received from the telecommand execution apparatus 100 of the satellite 10 and verifies execution of the telecommand in real-time.

The telecommand execution verification apparatus 200 of the satellite ground control system 20 includes a telecommand transmitter 210, a telecommand image database (DB) 220, a telemetry receiver 230, a telecommand verifier DB 240, a knowledge-base system 250, and a telecommand execution verifier 260.

The telecommand transmitter 210 transmits a real-time or time-tag telecommand to the satellite 10 and transmits the transmitted telecommand to the telecommand image DB 220.

The telecommand image DB 220 stores detail information on the transmitted telecommand as an image. The detail information on the transmitted telecommand are all information that can be inquired about the transmitted telecommand, for example, a transmitted time, a time-tag time, a command mnemonic, a command type, a command identifier, a used command argument, and command description. The telecommand image DB 220 is used to easily perform continuous management and verification-after-execution for all telecommands executed by the satellite 10 by the satellite ground control system 20 simultaneously having information on real-time telecommands and time-tag telecommands uploaded to the satellite 10.

The telecommand receiver 230 receives a telemetry transfer frame transmitted from the satellite 10. The telemetry transfer frame contains telecommand execution information generated by the satellite 10 after executing the telecommand. The telecommand receiver 230 determines through a command execution verification word flag byte contained in the received telemetry transfer frame whether the received telemetry transfer frame contains command execution verification words containing telecommand execution information and extracts the command execution verification words from the received telemetry transfer frame.

The telecommand verifier DB 240 matches a telecommand with a telecommand verifier needed to verify whether the telecommand has been normally executed, i.e., telemetry data of which a value must be confirmed in the telecommand transfer frame and defines and stores a correlation between the telecommand and the telecommand verifier.

The telecommand execution verifier 260 extracts telecommand execution information from the command execution verification words and determines which telecommand has been executed by the satellite.

The telecommand execution verifier 260 inquires detail telecommand information of a related telecommand, which has been stored when the telecommand was transmitted to the satellite 10, from the telecommand image DB 220 based on the telecommand execution information. The telecommand execution verifier 260 also inquires telemetry data, i.e., a telecommand verifier, from the telecommand verifier DB 240 based on the telecommand execution information. The telecommand execution verifier 260 extracts a measurement value of the inquired telemetry data from the telemetry transfer frame.

The telecommand execution verifier 260 transmits a telecommand image and the telecommand measurement value to the knowledge-base system 250.

The knowledge-base system 250 receives detail information of an executed telecommand and determines whether a telemetry data value is within an expected range. That is, the knowledge-base system 250 determines whether the telemetry data value is normal, by using the acquired detail telecommand information and telemetry data value as input information.

The telecommand execution verifier 260 determines according to a result output from the knowledge-base system 250 whether the telecommand execution has succeeded or failed, and finally records the determination result in a screen or event log or informs the operator of the determination result.

Figure 2:
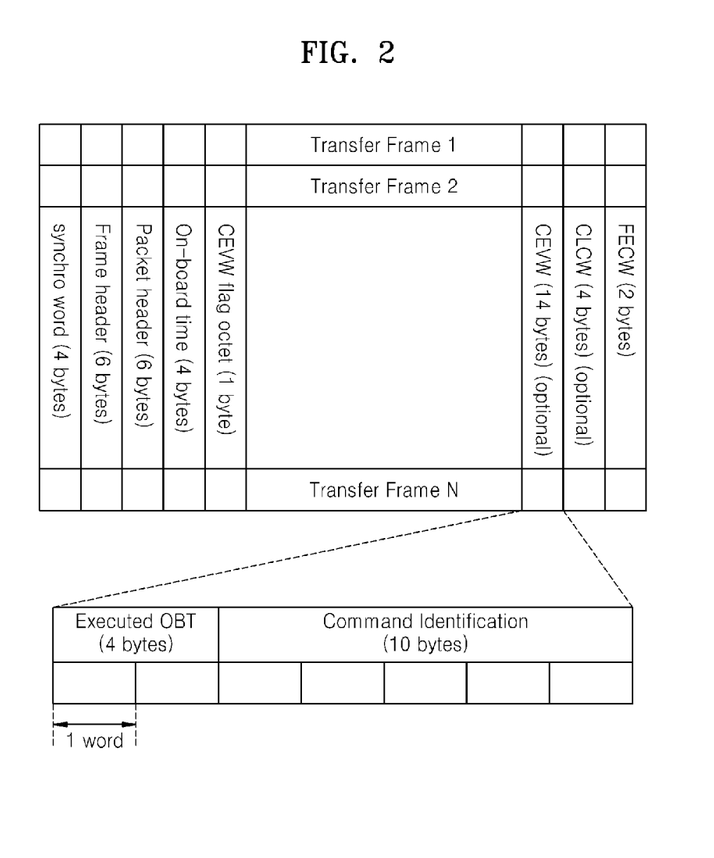
FIG. 2 illustrates a telemetry transfer frame containing command execution verification words for telecommand verification according to an embodiment of the present invention.

FIG. 2 illustrates a telemetry transfer frame for telecommand verification according to an embodiment of the present invention.

Referring to FIG. 2, a conventional telemetry transfer frame includes only a transfer header and a data field containing a general telemetry data value, whereas the telemetry transfer frame according to an embodiment of the present invention further includes a command execution verification word flag byte right after the header and command execution verification words right after the telemetry transfer frame. The command execution verification word flag byte indicates that the telemetry transfer frame contains the command execution verification words.

By inserting the command execution verification words in the telemetry transfer frame, a satellite ground control system can check a telecommand execution result as soon as a telecommand is executed by a satellite. If it is unnecessary to transmit the command execution verification words because the telecommand is not executed, the telemetry transfer frame may be transmitted without including the command execution verification words by marking that the command execution verification words are not transmitted in the command execution verification word flag byte.

That is, the command execution verification word flag byte can be selectively inserted into the telemetry transfer frame, and in order to determine whether the command execution verification words are inserted into the telemetry transfer frame, the command execution verification word flag byte, 1 byte, is used for determining whether the command execution verification words are used in the telemetry transfer frame. The command execution verification word flag byte can be defined by a user.

In the current embodiment, the command execution verification words are configured with 14 bytes, wherein first 4 bytes indicate an executed on-board time indicating a time that a telecommand is executed. The other 10 bytes indicate command identification information for determining what the executed telecommand is. In a command identification data word, information, such as a type of the telecommand and an ID number of the telecommand represented with hexadecimal code, for uniquely identifying the telecommand is inserted.

Figure 3:
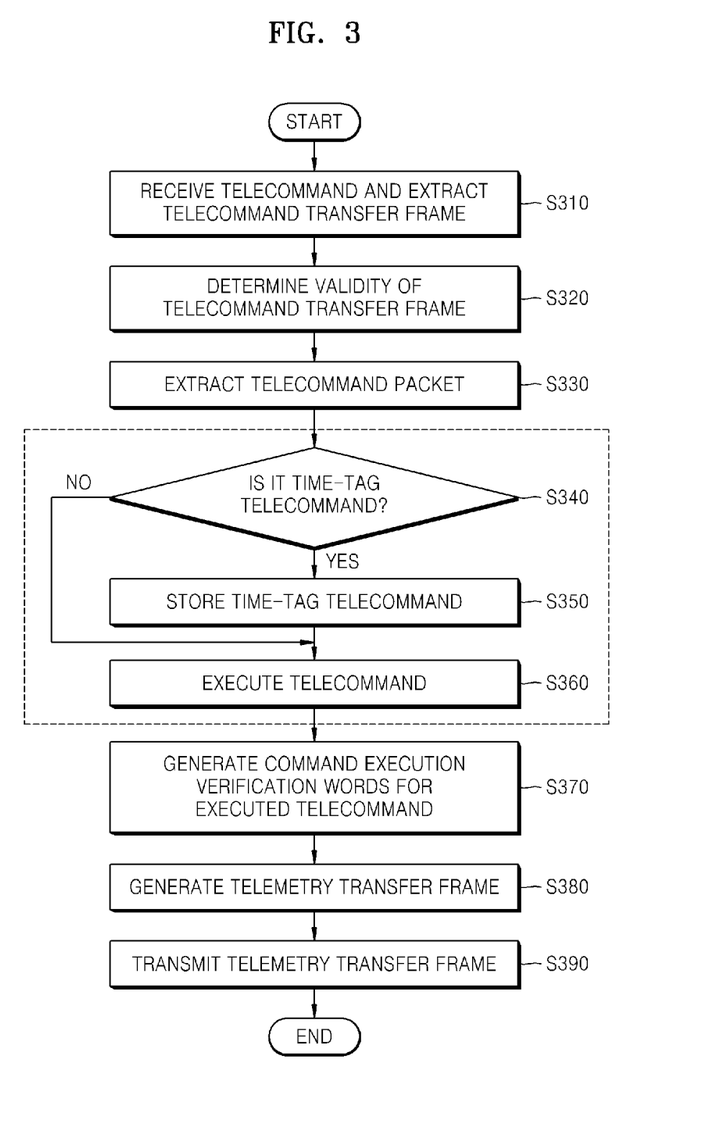
FIG. 3 is a flowchart illustrating a method of executing a telecommand on a satellite according to an embodiment of the present invention.

FIG. 3 is a flowchart illustrating a method of executing a telecommand on a satellite according to an embodiment of the present invention.

Referring to FIG. 3, in operation S310, a telecommand execution apparatus of a satellite receives a telecommand signal from a satellite ground control system and extracts a telecommand transfer frame from the received telecommand signal. The satellite ground control system transmits the telecommand and stores detail information of the transmitted telecommand in a telecommand image DB as an image.

In operation S320, a link control unit determines validity of the extracted telecommand transfer frame. That is, the link control unit rejects an abnormally received telecommand transfer frame and transmits a normally received telecommand transfer frame to an on-board computer.

The on-board computer executes the telecommand of the telecommand transfer frame.

In more detail, the on-board computer extracts a telecommand packet from the telecommand transfer frame in operation S330 and determines in operation S340 whether the extracted telecommand packet corresponds a real-time telecommand or a time-tag telecommand that must be executed at a predetermined specific time.

In a case of the real-time telecommand, the on-board computer immediately executes the telecommand in operation S360, and in a case of the time-tag telecommand, the on-board computer stores the time-tag telecommand in a time-tag telecommand memory in operation S350 and reads the time-tag telecommand from the time-tag telecommand memory and executes the read time-tag telecommand at the predetermined specific time in operation S360.

In operation S370, the on-board computer generates command execution verification words for the executed telecommand. The command execution verification words contain an executed on-board time, a type of the telecommand, and a unique number (ID number) of the telecommand. The type of the telecommand and the unique number of the telecommand are represented with hexadecimal code.

In operation S380, a command execution verification word flag byte and the generated command execution verification words are additionally inserted into the telemetry transfer frame. The command execution verification word flag byte indicates that the command execution verification words are contained in the telemetry transfer frame, by being inserted right after a header of the telemetry transfer frame.

In operation S390, a telemetry transmitter transmits the telemetry transfer frame to the satellite ground control system.

Figure 4:
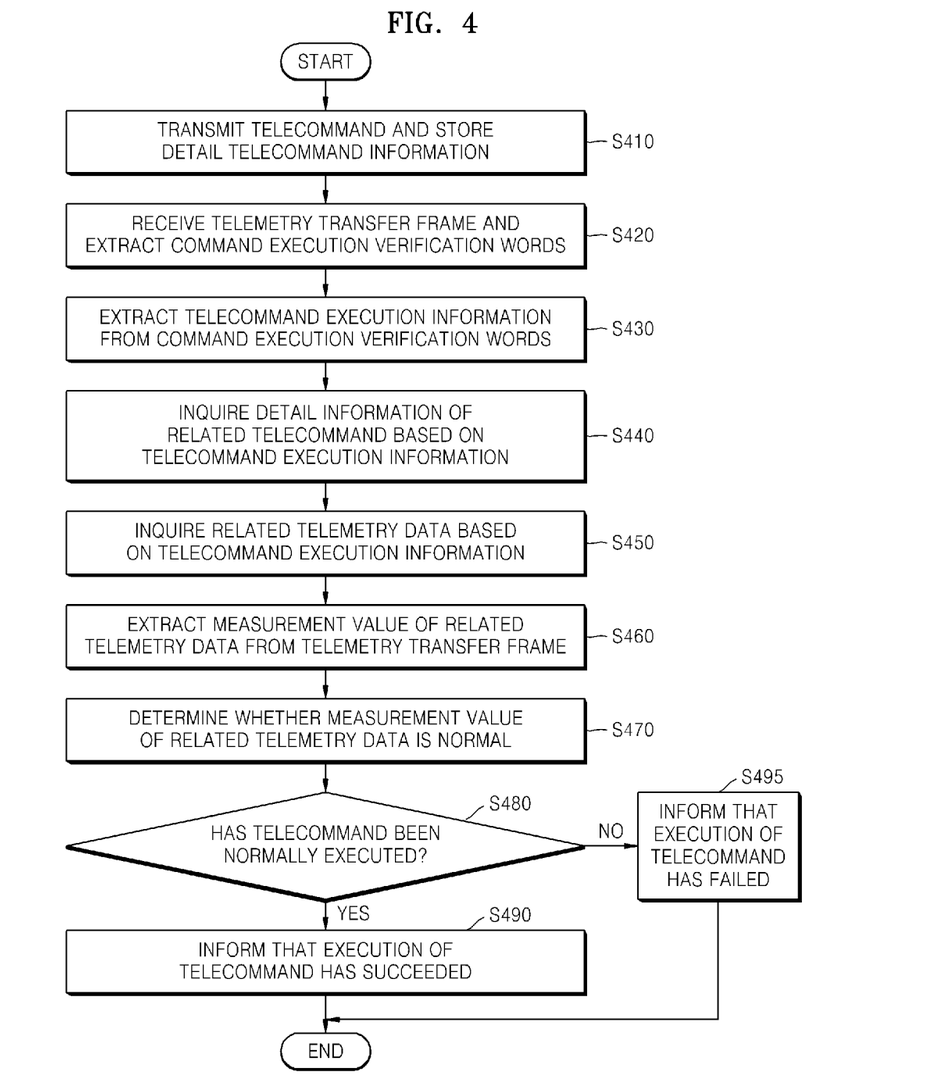
FIG. 4 is a flowchart illustrating a method of verifying telecommand execution on a satellite ground control system according to an embodiment of the present invention.

FIG. 4 is a flowchart illustrating a method of verifying telecommand execution on a satellite ground control system according to an embodiment of the present invention.

Referring to FIG. 4, in operation S410, a telecommand transmitter of the satellite ground control system transmits a telecommand to a satellite and stores detail information of the transmitted telecommand in a telecommand image DB.

In operation S420, a telecommand receiver of the satellite ground control system receives a telemetry transfer frame from the satellite and extracts command execution verification words from the received telemetry transfer frame. The command execution verification words of the telemetry transfer frame contain telecommand execution information generated by the satellite after executing the telecommand transmitted by the telecommand transmitter. The telecommand execution information includes, for example, an executed on-board time, a type of the telecommand, and a unique number (ID number) of the telecommand. The type of the telecommand and the unique number (ID number) of the telecommand are represented with hexadecimal code.

In operation S430, a telecommand execution verifier extracts the telecommand execution information from the command execution verification words and determines which telecommand has been executed by the satellite.

In operation S440, the telecommand execution verifier inquires detail telecommand information, which has been stored when the telecommand was transmitted to the satellite, from the telecommand image DB, based on the telecommand execution information.

In operation S450, the telecommand execution verifier inquires the executed telecommand and telemetry data, i.e., a telecommand verifier, used for the executed telecommand from a telecommand verifier DB based on the telecommand execution information. The telecommand verifier DB defines a correlation between the telecommand and the telemetry data needed to verify the telecommand by matching the telecommand with the telemetry data.

In operation S460, the telecommand execution verifier extracts a measurement value of the inquired telemetry data from general telemetry information transmitted together with the command execution verification words in the telemetry transfer frame.

In operation S470, the telecommand execution verifier transmits the inquired detail telecommand information and the extracted measurement value of the telemetry data to a knowledge-base system, and the knowledge-base system determines whether the telemetry data value is changed to a desired value by the telecommand executed by the satellite, i.e., is within an expected range.

In operation S480, it is determined based on a determination result of the measurement value of the telemetry data whether the telecommand has been normally executed.

If the measurement value of the telemetry data is a desired value, since the telecommand has been normally executed, it is informed in operation S490 that the telecommand execution has succeeded, and if the measurement value of the telemetry data is not changed to a request of the telecommand, it is informed in operation S495 that the telecommand execution has failed The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

As described above, according to the present invention, not only real-time execution verification of a real-time telecommand but also real-time execution verification of a time-tag telecommand that was difficult to perform are possible. That is, real-time execution verification can be guaranteed since verification of a telecommand execution result can be performed without a time delay by a satellite transmitting command execution verification words to a satellite ground control system for telecommand execution verification.

In addition, whenever a telecommand is executed, it can be immediately known using a telecommand image DB and a telecommand verifier DB what kind of telecommand has been executed and what kind of telemetry data must be checked, and thus, an operator does not need to know information regarding execution of an already transmitted telecommand, and even if any kind of telecommand is executed, an execution result of the telecommand can be perfectly verified.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for executing a telecommand on a satellite, the apparatus comprising:
    a telecommand receiver receiving a telecommand signal from a satellite ground control system and extracting a telecommand transfer frame from the received telecommand signal;
    a link control unit determining validity of the extracted telecommand transfer frame;
    an on-board computer executing a telecommand of a valid telecommand transfer frame, generating command execution verification words that contain telecommand execution information and uniquely identify the executed telecommand, and generating a telemetry transfer frame containing the command execution verification words and telemetry data; and
    a telemetry transmitter transmitting the telemetry transfer frame to the satellite ground control system.

2. The apparatus of claim 1, wherein the command execution verification words comprise a time that the telecommand was executed, a type of the telecommand, and a unique number of the telecommand.

3. The apparatus of claim 2, wherein the type of the telecommand and the unique number of the telecommand are represented with hexadecimal code.

4. The apparatus of claim 1, wherein the telemetry transfer frame comprises a flag indicating that the command execution verification words are inserted.

5. An apparatus for verifying telecommand execution on a satellite ground control system, the apparatus comprising:
    a telecommand transmitter transmitting a telecommand signal to a satellite;
    a telecommand image database (DB) storing detail information on the transmitted telecommand as an image;
    a telecommand verifier DB watching and storing telemetry data with the telecommand;
    a telecommand receiver receiving a telemetry transfer frame generated by executing the telecommand from the satellite and extracting command execution verification words, which contain telecommand execution information and uniquely identify the executed telecommand, from the received telemetry transfer frame;
    a telecommand execution verifier extracting the telecommand execution information from the command execution verification words, inquiring related telecommand detail information from the telecommand image DB based on the telecommand execution information, inquiring telemetry data matching with the telecommand from the telecommand verifier DB based on the telecommand execution information, and extracting a measurement value of the inquired telemetry data from the telemetry transfer frame; and
    a knowledge-base system determining based on the telecommand detail information and the measurement value of the telemetry data whether the measurement value of the telemetry data is normal so that the telecommand execution verifier determines whether the telecommand has been normally performed.

6. The apparatus of claim 5, wherein the telecommand receiver determines through a command execution verification word flag byte in the telemetry transfer frame whether the command execution verification words are inserted.

7. The apparatus of claim 5, wherein the telecommand execution verifier determines from the telecommand execution information what kind of telecommand has been executed in the satellite and inquires information regarding the determined telecommand.

8. The apparatus of claim 5, wherein the telecommand execution information comprises a time that the telecommand was executed, a type of the telecommand, and an identification (ID) number of the telecommand.

9. The apparatus of claim 8, wherein the type of the telecommand and the unique number of the telecommand are represented with hexadecimal code.

10. The apparatus of claim 5, wherein the telecommand execution verifier informs based on an output of the knowledge-base system that the determined telecommand has been normally executed or not.

11. A method of executing a telecommand on a satellite, the method comprising:
    receiving a telecommand signal from a satellite ground control system and extracting a telecommand transfer frame from the received telecommand signal;

determining validity of the extracted telecommand transfer frame;

executing a telecommand of a valid telecommand transfer frame;

generating command execution verification words that contain execution information of the executed telecommand and uniquely identify the executed telecommand, and generating a telemetry transfer frame containing the command execution verification words and telemetry data; and transmitting the telemetry transfer frame to the satellite ground control system.

12. The method of claim 11, wherein the command execution verification words comprise a time that the telecommand was executed, a type of the telecommand, and a unique number of the telecommand.

13. The method of claim 11, wherein the telemetry transfer frame comprises a flag indicating that the command execution verification words are inserted.

14. A method of verifying telecommand execution on a satellite ground control system, the method comprising:

transmitting a telecommand signal to a satellite and storing detail information on the transmitted telecommand as an image;

receiving a telemetry transfer frame generated by executing the telecommand from the satellite and extracting command execution verification words from the received telemetry transfer frame, the command execution verification words containing telecommand execution information and uniquely identifying the executed telecommand;

extracting the telecommand execution information from the command execution verification words;

inquiring related telecommand detail information based on the telecommand execution information;

inquiring telemetry data matching with the telecommand based on the telecommand execution information;

extracting a measurement value of the inquired telemetry data from the telemetry transfer frame;

determining based on the telecommand detail information and the measurement value of the telemetry data whether the measurement value of the telemetry data is normal; and determining based on a result of the determination whether the telecommand has been normally performed.

15. The method of claim 14, wherein the extracting of the command execution verification words comprises determining through a command execution verification word flag byte in the telemetry transfer frame whether the command execution verification words are inserted and extracting the command execution verification words.

16. The method of claim 14, further comprising, after the extracting of the telecommand execution information, determining from the telecommand execution information what kind of telecommand has been executed in the satellite.

17. The method of claim 14, wherein the telecommand execution information comprises a time that the telecommand was executed, a type of the telecommand, and an identification (ID) number of the telecommand.

18. The method of claim 14, further comprising informing the determined result that the telecommand has been normally executed or not.

* * * * *